United States Patent
Nelson et al.

(10) Patent No.: US 11,242,630 B2
(45) Date of Patent: Feb. 8, 2022

(54) WETTABLE FLUOROPOLYMER FIBER MATERIAL

(71) Applicant: Toray Fluorofibers (America), Inc., Decatur, AL (US)

(72) Inventors: Arthur Nelson, Decatur, AL (US); Taigi Yokota, Madison, AL (US); Dung Trieu, Fallkville, AL (US); Trevor Guldstrand, Huntsville, AL (US); Matthew Hutto, Trinity, AL (US)

(73) Assignee: Toray Fluorofibers (America), Inc., Decatur, AL (US)

( * ) Notice: Subject to any disclaimer, the term of this patent is extended or adjusted under 35 U.S.C. 154(b) by 55 days.

(21) Appl. No.: 15/078,475

(22) Filed: Mar. 23, 2016

(65) Prior Publication Data

US 2017/0275487 A1    Sep. 28, 2017

(51) Int. Cl.

| | |
|---|---|
| *D04H 3/005* | (2012.01) |
| *B32B 27/12* | (2006.01) |
| *C08L 27/18* | (2006.01) |
| *C08L 63/00* | (2006.01) |
| *D01D 5/06* | (2006.01) |
| *D01F 8/02* | (2006.01) |
| *D01F 8/04* | (2006.01) |
| *D04H 1/4318* | (2012.01) |
| *D04H 1/732* | (2012.01) |
| *B32B 27/32* | (2006.01) |
| *D01F 6/12* | (2006.01) |
| *D01F 8/12* | (2006.01) |
| *D01F 8/14* | (2006.01) |
| *D01F 8/16* | (2006.01) |

(52) U.S. Cl.
CPC ............ *D04H 3/005* (2013.01); *B32B 27/12* (2013.01); *B32B 27/322* (2013.01); *C08L 27/18* (2013.01); *C08L 63/00* (2013.01); *D01D 5/06* (2013.01); *D01F 8/02* (2013.01); *D01F 8/04* (2013.01); *D04H 1/4318* (2013.01); *D04H 1/732* (2013.01); *C08L 2205/16* (2013.01); *D01F 6/12* (2013.01); *D01F 8/12* (2013.01); *D01F 8/14* (2013.01); *D01F 8/16* (2013.01)

(58) Field of Classification Search
CPC ...................................... B29C 70/18
USPC ......................... 442/152, 153, 164
See application file for complete search history.

(56) References Cited

U.S. PATENT DOCUMENTS

| | | | |
|---|---|---|---|
| 5,723,081 A * | 3/1998 | Blankenbeckler | D01F 6/12 264/127 |
| 2006/0057925 A1* | 3/2006 | Auza | F16C 33/201 442/415 |
| 2010/0224710 A1* | 9/2010 | Donckers, II | B02C 19/06 241/5 |
| 2010/0227110 A1* | 9/2010 | Donckers, II | D01F 6/12 428/90 |
| 2013/0281579 A1* | 10/2013 | Nelson | B32B 5/04 524/43 |
| 2015/0031801 A1* | 1/2015 | Moon | D01F 6/12 524/35 |

FOREIGN PATENT DOCUMENTS

WO    WO9828470    *    7/1998

OTHER PUBLICATIONS

Badey et al. ("Influence of Chemical and Plasma Treatments on the Adhesive Properties of PTFE with an Epoxy Resin", Int. Journal of Adhesion and Adhesives, vol. 16, pp. 173-178, 1996) (Year: 1996).*
Machine translation of WO9828470 (Year: 1998).*
Badey et al. "Influence of Chemical and Plasma Treatments on the Adhesive Properties of PTFE with an Epoxy Resin", International Journal of Adhesion and Adhesives, 16, 173-178, 1996 (Year: 1996).*

* cited by examiner

*Primary Examiner* — Shawn Mckinnon
(74) *Attorney, Agent, or Firm* — C. Brandon Browning; Maynard, Cooper & Gale, PC

(57) ABSTRACT

A wettable, dispersion spun fluoropolymer fiber prepared from non-melt-processible fluoropolymer particles.

19 Claims, No Drawings

WETTABLE FLUOROPOLYMER FIBER MATERIAL

FIELD OF THE INVENTION

The present invention is directed to a fluoropolymer fiber material, and more particularly, to a wettable, dispersion spun fluoropolymer fiber yarn and mixtures formed therefrom.

BACKGROUND OF THE INVENTION

Fluoropolymers have properties such as extremely low coefficient of friction, wear and chemical resistance, dielectric strength, temperature resistance and various combinations of these properties that make fluoropolymers useful in numerous and diverse industries. For example, in the chemical process industry, fluoropolymers are used for lining vessels and piping. The biomedical industry has found fluoropolymers to be biocompatible and so have used them in the human body in the form of both implantable parts and devices with which to perform diagnostic and therapeutic procedures. In other applications, fluoropolymers have replaced asbestos and other high temperature materials. Wire jacketing is one such example. Automotive and aircraft bearings, seals, push-pull cables, belts and fuel lines, among other components, are now commonly made with a virgin or filled fluoropolymer component.

In order to take advantage of the properties of fluoropolymers, fluoropolymers often must be modified by decreasing their lubricity in order to be bonded to another material. That is because the chemical composition and resulting surface chemistry of fluoropolymers render them hydrophobic and therefore notoriously difficult to wet. Hydrophobic materials have little or no tendency to adsorb water and water tends to "bead" on their surfaces in discrete droplets. Hydrophobic materials possess low surface tension values and lack active groups in their surface chemistry for formation of "hydrogen-bonds" with water. In the natural state, fluoropolymers exhibit these hydrophobic characteristics, which requires surface modification to render them hydrophilic. The applications mentioned above all require the fluoropolymer to be modified.

One such modification includes chemically etching the fluoropolymers. For example, fluoropolymer films and sheets are often etched on one side to enable bonding it to the inside of steel tanks and piping; the outside diameter of small diameter, thin wall fluoropolymer tubing is etched to bond to an over-extrusion resulting in a fluoropolymer-lined guide catheter for medical use; fluoropolymer jacketed high-temperature wire is etched to allow the printing of a color stripe or other legend such as the gauge of the wire and/or the name of the manufacturer; fluoropolymer based printed circuit boards require etching to permit the metallization of throughholes creating conductive vertical paths between both sides of a double sided circuit board or connecting several circuits in a multilayer configuration.

The first commercially viable processes were chemical in nature and involved the reaction between sodium and the fluorine of the polymer. In time, some of the chemistry was changed to make the process less potentially explosive and hazardous, but the essential ingredient—sodium—remains the most reliable, readily available chemical 'abrasive' for members of the fluoropolymer family.

In addition to being hazardous, chemically etched fluoropolymer surfaces tend to lose bond strength over time. It has been shown that temperature, humidity and UV light have a detrimental effect on etched surfaces. Tests have shown that etched fluoropolymer parts exposed to 250° F. for 14 days exhibit bond strengths approximately 40% weaker than those done on the day they were etched. Further, depending upon the wavelength and intensity of the UV light source, the bond strength deterioration can occur over a period of months and years. It is thought that, due to the somewhat amorphous nature of these polymers, a rotational migration occurs over time, accelerated by some ambient condition—especially heat—that re-exposes more of the original C2F4 molecule at the surface resulting in a lower coefficient of friction.

Other methods include mechanically modifying the surfaces of fluoropolymer fibers. For example, U.S. Pat. Nos. 8,003,208, 8,132,748 and 8,132,748 disclose a fluoropolymer fiber including an improved hydrophilicity and a surface deformation configured for providing the improved hydrophilicity wherein the surface deformation is a split, a tear and/or a slit. The surface deformations are produced by milling the fibers, for example, by processing the fibers in a jet mill or a cryogenic grinding mill. The surface modifications brought about by these processes increase the surface area and roughness of the fluoropolymer materials thereby increasing the capillary action of the materials.

SUMMARY OF THE INVENTION

The present invention is directed to materials and mixtures including readily dispersible dispersion spun fluoropolymer fibers. Unlike conventional dispersible fluoropolymer fibers, the fibers of the present invention are intact, meaning the fibers are whole with essentially no portion of the fibers being removed, for example, as occurs when fluoropolymer fibers are chemically etched or milled. Thus, wettability of the fluoropolymer fibers of the present invention is not reliant upon deforming the fibers or increasing the surface area of the fibers. Instead, the wettability of the dispersion spun fibers depends upon the amount of matrix polymer making up the fiber.

More particularly, dispersion spun or wet fluoropolymer yarns are typically produced by forming a spin mix containing an aqueous dispersion of fluoropolymer particles and a solution of a cellulosic ether matrix polymer. The spin mix is then extruded at relatively low pressure (e.g., less than 150 pounds per square inch) through an orifice into a coagulation solution usually containing sulfuric acid to coagulate the matrix polymer and form an intermediate fiber structure. The intermediate fiber structure, once washed free of acid and salts, is passed over a series of heated rolls to dry the fiber structure and sinter the fluoropolymer particles into a continuous fluoropolymer filament yarn. Sintering is required to coalesce the fluoropolymer particles and impart to the fiber the requisite tensile strength. A by-product of sintering includes removal of essentially the entire matrix polymer from the fiber. For example, sintered, dispersion spun fluoropolymer fibers normally include less than 5% by weight matrix polymer.

The present invention is based upon the unexpected discovery that un-sintered, dispersion spun fluoropolymer fibers can be readily dispersed in viscous materials such as thermoset, thermoplastic and elastomeric resins thereby imparting improved surface characteristics to products formed from the viscous materials. Therefore, according to one aspect of the invention, there is provided a composition of matter including a viscous material and about 10% to about 20% by weight or up to about 75% by weight of a fluoropolymer fiber material wherein the fluoropolymer fiber material is uniformly and substantially wetted by the viscous material. Exemplary viscous materials include thermoset resins such as polyurethanes, melamine resin, vulcanized rubber, epoxies, polyesters, phenolics, vinyl esters, polyurethanes, silicones, polyamides and polyamide-imides and thermoplastic resins such as acrylics, nylons, polycarbonate thermoplastics, polyether sulfones, polyethylene, polypropylene, and polyvinyl chloride, The fluoropolymer fiber material is composed of dispersion spun fluoropolymer fibers prepared from a spin mix including an aqueous dispersion of insoluble fluoropolymer particles and an aqueous solution containing the cellulosic matrix polymer wherein the cellulosic matrix polymer is coagulated about the fluoropolymer particles to form the fluoropolymer fibers. The cellulosic matrix polymer is selected from the group consisting of methylcellulose, hydroxyethylcellulose, methylhydroxypropylcellulose, hydroxypropylmethylcellulose, hydroxypropylcellulose, ethylcellulose and carboxymethylcellulose and forms between about 15% and about 25% by weight of the fluoropolymer fiber material. The resulting composition can be used in the preparation of prepregs, coatings, linings, self-lubricating bearings, wet laid nonwoven materials and the like. When the fluoropolymer fiber material has a particle size of about 127 microns or less, the composition performs similarly to colloidal dispersions, i.e., the fluoropolymer fiber material remains dispersed and does not settle out.

According to another aspect of the invention, there is provided a method of making a composition of matter including forming a mixture by combining fluoropolymer particles with a matrix polymer solution containing a matrix polymer such a cellulosic polymer, forming a fluoropolymer fiber by extruding the mixture into a coagulation bath, the fluoropolymer fiber including at least about 15% by weight of the matrix polymer, and combining the fluoropolymer fiber with a viscous material such a thermoset or thermoplastic resin. By virtue of the relatively high matrix polymer content, the fluoropolymer fiber is substantially wetted by the viscous material. The matrix polymer content is conserved by refraining from sintering the fiber following coagulation of the matrix polymer.

According to yet another aspect of the invention, there is provided a mixture including about 0.5% to about 40% by weight, about 10% to about 20% by weight or about 18% to about 21% by weight a first material prepared from a matrix spun fluoropolymer yarn, the fluoropolymer yarn including about 15% to about 25% by weight of a cellulosic polymer, and a second material which substantially wets the first material, the second material being selected from the group consisting of water, an aqueous solution, a polymer solution, a thermoset resin, an adhesive, an elastomeric resin, a thermoplastic resin, a solvent, a viscous material and a liquid. When the first material has a sufficiently small particle size, the mixture may form a colloidal like suspension.

DETAILED DESCRIPTION OF THE INVENTION

The present invention is directed to a readily dispersible, dispersion spun fluoropolymer fiber and mixtures formed therefrom. Generally, the fluoropolymer fiber is prepared by forming an aqueous dispersion of fluoropolymer particles, mixing the dispersion with an aqueous matrix polymer solution containing a matrix polymer, extruding the mixture into a coagulation bath and forming a fiber structure. The fiber structure is then heated to dry the fiber structure but without decomposing the matrix polymer. The resulting fiber includes about 15% to about 25% by weight of the matrix polymer. When mixed with a viscous material such a thermoset, elastomeric or thermoplastic resin, the fiber is uniformly and substantially wetted by the second material.

By fluoropolymer fiber it is meant a fiber prepared from polymers such as polytetrafluoroethylene, and polymers generally known as fluorinated olefinic polymers, for example, copolymers of tetrafluoroethylene and hexafluoropropene, copolymers of tetrafluoroethylene and perfluoroalkyl-vinyl esters such as perfluoropropyl-vinyl ether and perfluoroethyl-vinyl ether, fluorinated olefinic terpolymers including those of the above-listed monomers and other tetrafluoroethylene based copolymers. For the purposes of this invention, the preferred fluoropolymer fiber is a polytetrafluoroethylene fiber.

By substantially wetted it is meant that the viscous material remains in contact with at least at least 90% or about 100% of the surface of the fluoropolymer fiber material two minutes after mechanically mixing the fluoropolymer fiber material with the viscous material. Alternatively, substantially wetted means that the viscous material exhibits a contact angle with the fluoropolymer fiber material of less than 90°, less than 60°, less than 45°, less than 30° or less than 15°.

The fluoropolymer fiber of the present invention is dispersion spun by mixing a dispersion of insoluble fluoropolymer particles with a solution of a soluble matrix polymer and coagulating the mixture into filaments by extruding the mixture into a coagulation solution in which the matrix polymer becomes insoluble. One method which is commonly used to dispersion spin fluoropolymers includes spinning the polymer from a mixture of an aqueous dispersion of the polymer particles and viscose, where cellulose xanthate is the soluble form of the matrix polymer, as taught for example in U.S. Pat. Nos. 3,655,853; 3,114,672 and 2,772,444. However, the use of viscose suffers from some serious disadvantages. For example, when the fluoropolymer particles and viscose mixture is extruded into a coagulation solution for making the matrix polymer insoluble, the acidic coagulation solution converts the xanthate into unstable xantheic acid groups, which spontaneously lose CS2, an extremely toxic and volatile compound. Preferably, the fluoropolymer fiber of the present invention is prepared using a more environmentally friendly method than those methods utilizing viscose. One such method is described in U.S. Pat. Nos. 5,820,984; 5,762,846, and 5,723,081, which patents are incorporated herein in their entireties by reference. In general, this method employs a cellulosic ether polymer such as methylcellulose, hydroxyethylcellulose, methylhydroxypropylcellulose, hydroxypropylmethylcellulose, hydroxypropylcellulose, ethylcellulose or carboxymethylcellulose as the soluble matrix polymer, in place of viscose. For the purposes of this invention, the preferred method of making the fluoropolymer fiber is by dispersion spinning where the matrix polymer is a cellulosic ether polymer.

Following extrusion of the mixture into the coagulation solution, the filaments are washed in near neutral pH water to remove substantially all ions and impurities such as additives and/or dispersants that are present in the initial fluoropolymer dispersion. The resulting fluoropolymer fiber is then partially dried by passing the fiber over a series of heating rolls operating at a temperature that is less than the sintering temperature of the fibers or about 100° F. to about 400° F. Thereafter, the partially dried fluoropolymer filament fiber may be passed directly from the series of heated rolls to a series of drawing rolls operating at ambient temperature. After drawing, the fluoropolymer filament fiber is further dried, wound and stored.

The fluoropolymer fiber material prepared according to the foregoing process includes between about 15% and about 25% by weight of the cellulosic matrix polymer. The presence of the cellulosic matrix polymer in the disclosed amounts improves the hydrophilicity of the fluoropolymer fiber and makes it readily dispersible in and substantially wettable by liquids.

Depending on the anticipated use of the fluoropolymer fiber material, the fluoropolymer fiber can be made into floc or staple using any number of means known in the art. Preferably, the fluoropolymer fiber is cut into floc or staple by a guillotine cutter, which is characterized by a to-and-fro movement of a cutting blade. Following cutting, the fluoropolymer fibers preferably have lengths ranging between 127 microns and 115,000 microns.

When the processed fluoropolymer fiber material of the present invention is mixed with a resin and molded into a part, the properties imparted to the part by including the fiber material are enhanced or improved over the properties imparted by the prior art or conventional fluoropolymer fibers, including for example, increasing the resistance of the part to chemicals, oxidation, moisture, weathering, ozone or ultraviolet radiation and increasing the hydrophilicity or wettability of the part. Thus, the processed fluoropolymer fiber can be used to impart these improved properties in electrical components, chemical processing equipment and in coatings for cooking utensils, pipes, bearings, bushings, fabrics, filters and gaskets. Specific applications are described, for example, in U.S. Pat. No. 6,695,734 (rubber belts); U.S. Pat. No. 6,506,491 (friction applications such as bearings, bushings and seals); U.S. Pat. No. 6,299,939 (diaphragms for use in an electrolytic cells); U.S. Pat. No. 6,180,574 (self-lubricating bearings and coatings), U.S. Pat. No. 5,527,569 (filter media for forming filter cloth, filter bags and filter cartridges) and U.S. Patent Application Publication No. 20060057925 (prepregs and nonwoven materials for low friction bearing surfaces).

As will be apparent to one skilled in the art, various modifications can be made within the scope of the aforesaid description. Such modifications being within the ability of one skilled in the art form a part of the present invention and are embraced by the claims below.

It is claimed:

1. A composition of matter consisting of a viscous material and a wettable fluoropolymer fiber, the wettable fluoropolymer fiber including between about 15% and about 25% by weight of a cellulosic matrix polymer wherein the viscous material is a thermoset resin and wherein the wettable fluoropolymer fiber is intact with essentially no portion of the wettable fluoropolymer fiber being etched.

2. The composition of claim 1 wherein the wettable fluoropolymer fiber includes dispersion spun fluoropolymer fibers prepared from a spin mix including an aqueous dispersion of insoluble fluoropolymer particles and an aqueous solution containing the cellulosic matrix polymer wherein the cellulosic matrix polymer is coagulated about the fluoropolymer particles to form the dispersion spun fluoropolymer fibers.

3. The composition of claim 1 wherein the cellulosic matrix polymer is selected from the group consisting of methylcellulose, hydroxyethylcellulose, methylhydroxypropylcellulose, hydroxypropylmethylcellulose, hydroxypropylcellulose, ethylcellulose and carboxymethylcellulose.

4. The composition of claim 1 wherein the wettable fluoropolymer fiber is uniformly and substantially wetted by the viscous material and not milled or chemically etched.

5. The composition of claim 1 wherein the thermoset resin is selected from the group consisting of epoxy, polyester, phenolic, vinyl ester, polyurethane, silicone, polyamide and polyamide-imide.

6. A prepreg comprising the composition of claim 1.

7. A composition of matter consisting of a viscous material and a wettable fluoropolymer fiber, the wettable fluoropolymer fiber including between about 15% and about 25% by weight of a cellulosic matrix polymer wherein the viscous material is an aqueous solution and wherein the wettable fluoropolymer fiber includes essentially no surface etching.

8. A composition of matter consisting of a viscous material and a wettable fluoropolymer fiber, the wettable fluoropolymer fiber including between about 15% and about 25% by weight of a cellulosic matrix polymer wherein the viscous material is a polymer solution and wherein the wettable fluoropolymer fiber includes essentially no surface modifications.

9. The composition of claim 1 including about 10% to about 20% by weight of the wettable fluoropolymer fiber.

10. A wet-laid nonwoven material prepared from the composition of claim 1.

11. The composition of claim 2 including about 10% to about 20% by weight of the wettable fluoropolymer fiber wherein the wettable fluoropolymer fiber is substantially wetted by the viscous material and not milled or chemically etched.

12. The composition of claim 1 wherein the composition is a colloidal suspension and the wettable fluoropolymer fiber is not milled or chemically etched.

13. The composition of matter claim 4 wherein the wettable fluoropolymer fiber is free of surfactant.

14. The composition matter of claim 1 wherein the wettable fluoropolymer fiber is an un-sintered fluoropolymer fiber.

15. The composition of matter of claim 8 wherein the wettable fluoropolymer fiber includes essentially no surface modifications that increase the surface area or roughness of the wettable fluoropolymer fiber.

16. A composition of matter consisting essentially of a thermoset resin and a fluoropolymer fiber material including between about 15% and about 25% by weight of a cellulosic matrix polymer.

17. The composition of matter of claim 16 wherein the wettable fluoropolymer fiber is uniformly and substantially wetted by the thermoset resin.

18. The composition of claim 16 wherein the wettable fluoropolymer fiber is intact.

19. The composition of claim 16 wherein the wettable fluoropolymer fiber is not etched.

* * * * *